United States Patent [19]
Goldberg

[11] 3,842,341
[45] Oct. 15, 1974

[54] RINGING CHOKE INVERTER WITH COMMUTATION CIRCUIT

[75] Inventor: Jacob Goldberg, Newtonville, Mass.

[73] Assignee: United States Scientific Instruments Inc., Watertown, Mass.

[22] Filed: May 2, 1973

[21] Appl. No.: 356,401

[52] U.S. Cl. .............. 321/45 C, 307/252 M, 321/2
[51] Int. Cl. ............................................. H02m 3/32
[58] Field of Search ........... 307/252 M; 321/45 C, 2

[56] References Cited
UNITED STATES PATENTS

| 3,530,503 | 9/1970 | Appelo et al. | 321/45 C |
|---|---|---|---|
| 3,562,611 | 2/1971 | Gurwicz | 321/45 C |
| 3,594,629 | 7/1971 | Kawakami et al. | 321/45 C X |
| 3,648,151 | 3/1972 | Gurwicz | 321/45 C X |
| 3,652,874 | 3/1972 | Partridge | 321/45 C |
| 3,663,942 | 5/1972 | Jakobsen | 321/45 C X |
| 3,667,021 | 5/1972 | Anderson | 321/45 C X |

FOREIGN PATENTS OR APPLICATIONS

| 1,060,317 | 3/1967 | Great Britain | 321/45 C |

Primary Examiner—William M. Shoop
Attorney, Agent, or Firm—Rines and Rines; Shapiro and Shapiro

[57] ABSTRACT

The present invention relates to ringing choke inverters with commutation circuits, being more particularly concerned with the commutation or extinguishing of SCR or similar trigger switches used in ringing choke inverter circuits in which dc power is converted into impulses for application to a load.

5 Claims, 1 Drawing Figure

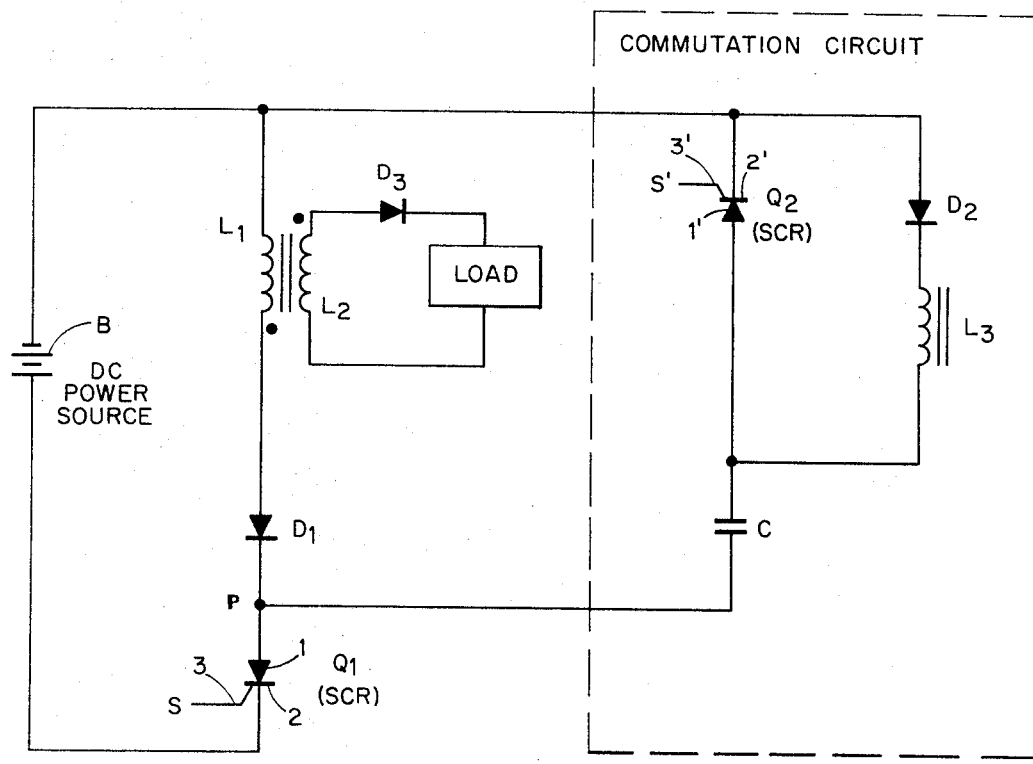

RINGING CHOKE INVERTER WITH COMMUTATION CIRCUIT

Ringing choke inverters of this character have been commonly used in automotive ignition systems, photoflash power supplies, and similar applications as described, for example, in "Designing DC-DC Converters for Capacitor Charging With Batteries," by Lynn T. Rees, Motorola Application Note AN 442, Oct, 1968. Because of the requirement that the switching circuit involved in the inductive energy storage system must be turned off with reliability when the energy stored in the choke reaches the desired value, transistors and other types of switches, which may readily be cut off, have heretofore been employed. Unfortunately, however, such transistor switches are limited in their power-handling capability, and it would have been far more desirable to be able to employ power switching elements such as SCR's. Such elements, however, are subject to difficulty and unreliability in cutting off at periodic intervals of time, such that SCR's and similar high-power switching elements have not heretofore been adaptable for purposes such as the ringing circuit use of the present invention.

In accordance with the invention, however, a commutation or protection extension circuit has been evolved that is particularly adapted for use with such ringing circuit systems, as well as others, and that now enables the employment of power switching elements such as SCR's in such circuits.

An object of the present invention, accordingly, is to provide a novel ringing circuit employing high-power switching elements in cooperation with a commutation circuit, particularly adapted to the employment, with reliability, of such high-power switching elements.

A further object is to provide a new and improved SCR or other similar switching-element commutation circuit.

Other and further objects will be explained hereinafter and are more particularly delineated in the appended claims.

In summary, the invention contemplates a ringing-commutation system having, in combination, an inverter circuit comprising a ringing choke connected with a direct current source of power in a first circuit loop containing first switching means which, when rendered conductive, enables the storage of energy from said source in said ringing choke through said first circuit loop; a commutation circuit connected across the ringing choke comprising a series resonant charging circuit including storage capacitor means chargeable by such series resonance and a second circuit loop including said storage capacitor means and further switching means; a load coupled to the ringing choke; first pulse generating means for rendering the first switching means conductive to enable said storing of energy in the ringing choke and the series resonance charging of said capacitor means; and further pulse generating means connected with the further switching means for rendering the same conductive at a time when the ringing choke has stored a predetermined value of energy to enable the commutation discharge of the capacitor means through said ringing choke.

The invention will now be described with reference to the accompanying drawing, the single FIGURE of which is a schematic circuit diagram showing the invention in preferred form.

Referring to the diagram, a ringing choke inverter is illustrated as comprising a source of direct-current power, schematically illustrated as a battery B, connected with a linear ringing choke inductor $L_1$, and through a diode $D_1$ (the purposes of which will be later explained), to the anode 1 of an SCR or similar high-power electron switching device $Q_1$, the cathode 2 of which is shown returned to the dc power source B. The gate electrode 3 of $Q_1$ is connected to be periodically triggered, as by a multivibrator pulse generator or similar source S to cause energy periodically to be stored in the inductor $L_1$ in the ringing circuit. The energy built up in inductor $L_1$ may be delivered through a secondary step-up winding $L_2$ and a diode $D_3$ to a load, so-labelled.

In systems for automotive or similar use, the function of the switching element $Q_1$ will be performed by the breaker points themselves. In the electronic version using the high power switching SCR $Q_1$, however, the present invention employs a commutation circuit which includes a capacitor C connected from a point P intermediate the diode $D_1$ and the switching device $Q_1$ to the anode 1' of a second SCR or similar switching element $Q_2$, the cathode 2' of which is returned to the upper terminal of the inductor $L_1$. Shunting the switch $Q_2$ is a further diode $D_2$ and a choke $L_3$.

Upon turn-on of $Q_1$, the supply voltage is applied across $L_1$ and also across the entire commutation circuit. Thus, as the current builds up in $L_1$, the capacitor C is charged by means of $L_3$ and diode $D_2$ in a series-resonant manner, so that the voltage finally developed on capacitor approaches twice that of the dc power source B. The diode $D_2$ is the hold-off device or check valve in the resonant charging circuit. During this operation, the switch $Q_2$ is in the off or open-circuit condition. The capacitor C will become charged with its upper terminal positive and its lower terminal at point P, negative. At a time determined by the time constant involved in developing a predetermined amout of energy in inductance $L_1$, the gate electrode 3' of the switching device $Q_2$ will then be triggered via S' to render $Q_2$ conductive.

The current in inductance $L_1$ hitherto supplied through the loop consisting of battery B, inductance $L_1$, diode $D_1$ and switching device $Q_1$, will then be supplied through the loop comprising capacitor C, diode $D_1$, inductance $L_1$ and SCR $Q_2$. At the same time, an inverse voltage will be imposed at the anode 1 of $Q_1$. The source of energy within this new loop for sustaining the current in inductance $L_1$ is the capacitor C previously charged in a resonant manner through inductance $L_3$. This results in the resonant discharge of C through inductor $L_1$ and diode $D_1$. During this resonant discharge or commutation interval, $Q_1$, having been relieved of its anode current and having inverse voltage imposed on its anode, recovers its ability to hold off forward voltage. The commutation interval is complete when capacitor C becomes discharged below that necessary to sustain the current in inductance $L_1$. The resulting rapid decrease in current through $L_1$ causes a voltage to be induced in $L_1$ and, through magnetic coupling $L_2$ according to the relationship $V_{L_1} = L di/1dt$ or $V_{L_2} = (N_{L_2}/N_{L_1})V_{L_1}$, where N= the number of turns per respective winding.

When charging, the current in $L_1$ is increasing; and when the current through $L_1$ is interrupted, the current decreases. A stepped-up voltage of opposite polarity is therefore induced at $L_2$ from that obtained in the initial charging process. This may pass the rectifier $D_3$ and energize the load. The same voltage induced in $L_1$ when the current ceases, causes the capacitor C to be charged in opposite polarity to that which is obtained during the charge portion of $L_1$. The role of $D_1$ is as a check valve or hold-off diode for the reverse charge in capacitor C. Thus the resonant circuit established by $L_1$, $D_1$ and C through the conduction of $Q_2$ serves at least two functions. First, it creates the inverse voltage at P for extinction of $Q_1$. By delivering its stored energy as excitation current to the inductance $L_1$, it ultimately contributes to the energy delivered to the load. As the capacitor C becomes oppositely charged during the reverse ringing of $L_1$ through $D_1$, the current flowing through C will ultimately decrease its value such that SCR $Q_2$ will extinguish. When sufficient time has elapsed for stored energy to be delivered to the load, the next trigger pulse will be applied from the before-mentioned pulse-generating source S, again to render $Q_1$ conductive and to restart the cycle. Again, depending upon the previously mentioned time constant, the further pulse-generating source S' will trigger $Q_2$ on, at the appropriate instant previously described, so that the circuit may operate repetitively.

It will be observed that the circuit of the present invention is not composed of dissipative elements so that its efficiency is quite high. As before stated, the energy in the commutation circuit contributes to the useful energy applied to the load and is derived and applied by magnetic coupling at the ringing choke $L_1$. The dots indicated on the windings $L_1$ and $L_2$ indicate polarity.

The load may assume a number of forms including, for example, the capacitor bank of a flash discharge circuit such as, for example, described in U.S. Letters Pat. No. 3,624,446. The energy will be delivered to such a capacitor load in more or less discreet uniform increments at a uniform rate, thus tending to level out any surges. This circuit is thus useful for such capacitive loads. In addition, it is a means of charging such capacitive loads at a uniform rate and with non-dissipative elements, again providing improved efficiency.

While a magnetically coupled output winding $L_2$ is illustrated, moreover, the coupling may come directly from the ringing choke $L_1$ with the diode $D_3$ connected to a terminal thereof and feeding the ultimate load. Similarly, the connection of the commutation circuit across the ringing choke $L_1$ may assume a different point of connection than illustrated. For example, the commutation circuit terminals could be connected to different tap positions on the ringing choke $L_1$ or windings coupled thereto.

In a successful circuit, a dc source B of about 100 volts was employed, with $L_1$ about 0.4 millihenries, capacitor C about 1.0 microfard, SCR elements $Q_1$ and $Q_2$, and with the ringing choke $L_1$ and the step-up winding $L_2$, 120 T : 1,000T, wound on core GL No. LZp. The performance that was obtained included output power of 200 watts and efficiency of 80 percent delivered into various types of resistive loads and capacitor discharge circuits.

Further modifications will occur to those skilled in this art and all such are considered to fall within the spirit and scope of the invention as defined in the appended claims.

What is claimed is:

1. A ringing-commutation system having, in combination, an inverter circuit comprising a ringing choke connected with a direct current source of power in a first circuit loop containing first switching means which, when rendered conductive, enables the storage of energy from said source in said ringing choke through said first circuit loop; a commutation circuit connected across the ringing choke comprising a series resonant charging circuit including storage capacitor means chargeable by such series resonance and a second circuit loop including said storage capacitor means and further switching means; a load coupled to the ringing choke; first pulse generating means for rendering the first switching means conductive to enable said storing of energy in the ringing choke and the series resonance charging of said capacitor means; and further pulse generating means connected with the further switching means for thereafter rendering the same conductive to enable the commutation discharge of the capacitor means through said ringing choke.

2. A ringing-commutation system as claimed in claim 1 and in which said switching means comprise SCR devices, and wherein said charging of said capacitor means applies voltage for maintaining said further switching means cut-off.

3. A ringing-commutation system as claimed in claim 1 and in which the said resonant charging circuit comprises diode means and inductance means connected in parallel with said further switching means.

4. A ringing-commutation system as claimed in claim 1 and in which the said load comprises capacitor means.

5. A ringing-commutation system as claimed in claim 1 and in which the load is energized through diode means connected in series with means magnetically coupled with said ringing choke.

* * * * *